March 24, 1964  J. J. SKOWRON, SR  3,125,854
ROTARY ENGINE
Filed Oct. 31, 1961  2 Sheets-Sheet 2
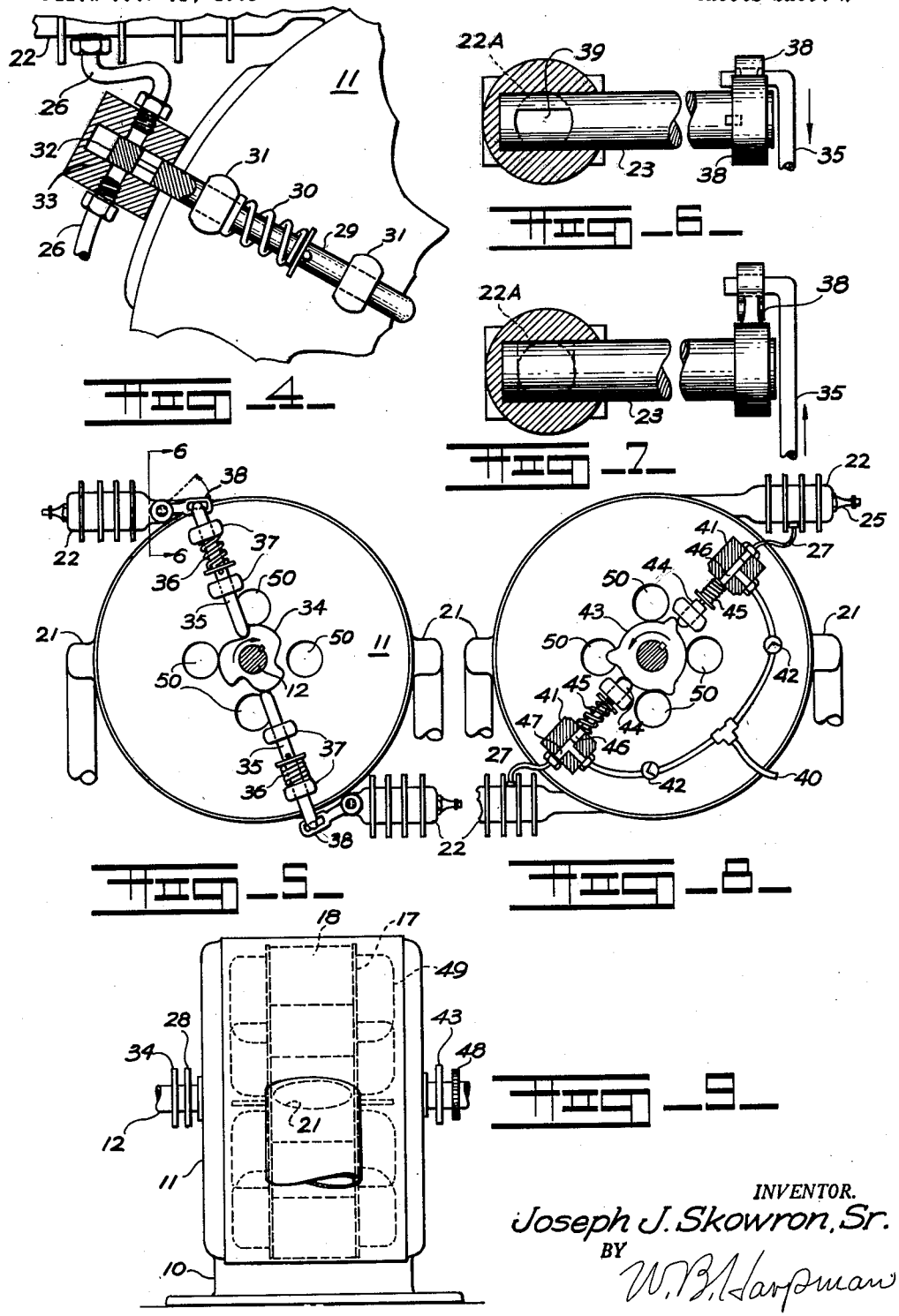
INVENTOR.
Joseph J. Skowron, Sr.
BY
W. B. Harpman
ATTORNEY.

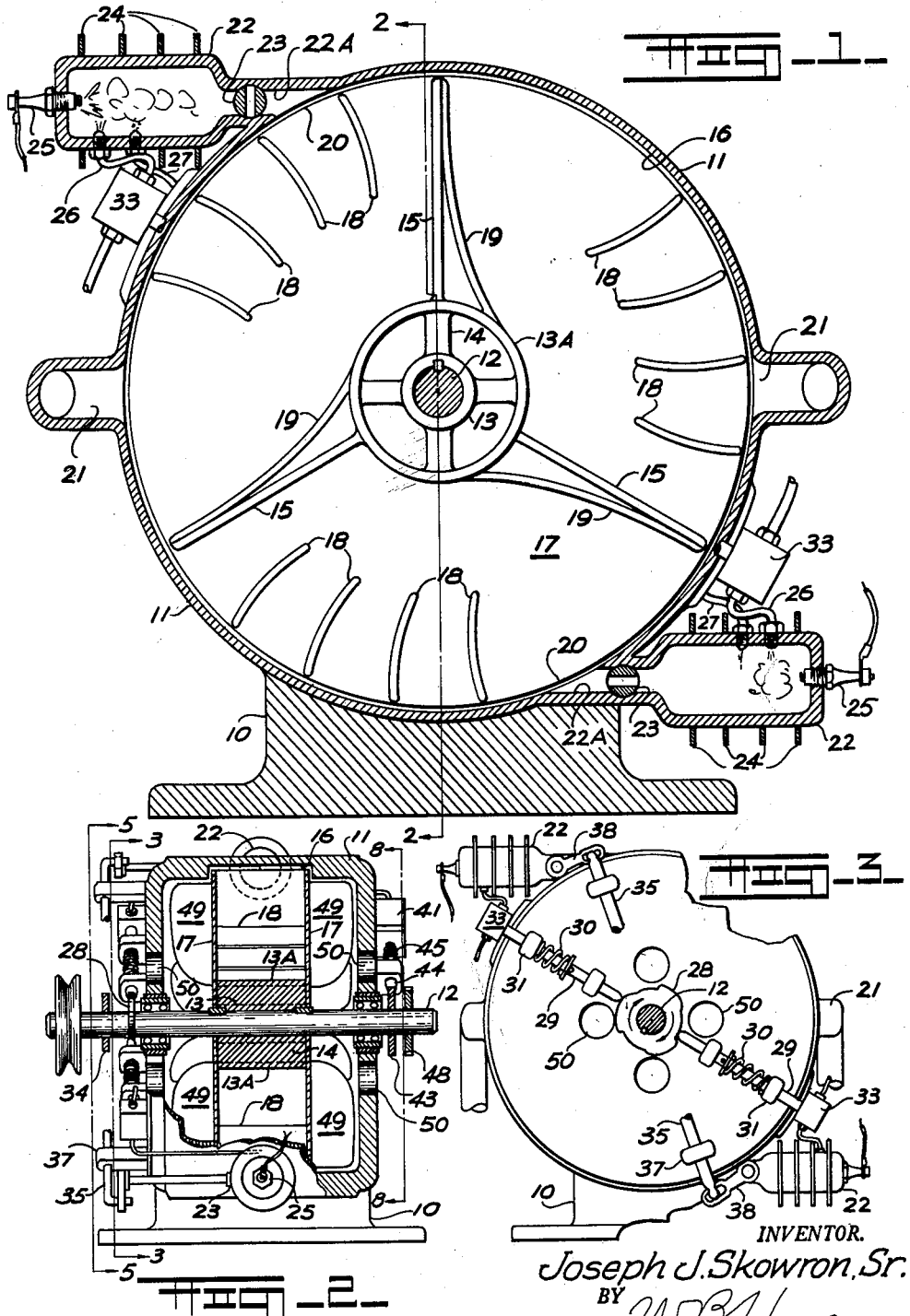

United States Patent Office 3,125,854
Patented Mar. 24, 1964

3,125,854
ROTARY ENGINE
Joseph J. Skowron, Sr., 565 W. Chalmers Ave.,
Youngstown, Ohio
Filed Oct. 31, 1961, Ser. No. 148,940
3 Claims. (Cl. 60—39.38)

This invention relates to a rotary engine and more particularly to a jet gun rotary engine in which the jet guns comprise internal combustion devices.

The principal object of the invention is the provision of a rotary engine including a turbine-like rotor and means for firing fuel charges and directing the same thereagainst so as to rotate the same.

A further object of the invention is the provision of a rotary engine incorporating integral cooling means for a turbine therein.

A further object of the invention is the provision of a rotary engine including a plurality of firing chambers and means for directing fuel charges thereinto and expanding gases therefrom so as to rotate a turbine of said engine.

The rotary engine disclosed herein comprises a housing having a transversely positioned rotatable shaft on which a turbine of novel design is mounted. Means exteriorly of said housing receives fuel charges and upon firing direct the expanding burning gases against the turbine so as to revolve the same. A high speed relatively lightweight rotary engine is thus formed which incorporates a novel turbine structure and charging and firing means for rotating the same.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a cross section of the rotary engine.

FIGURE 2 is a cross section on line 2—2 of FIGURE 1 on a reduced scale.

FIGURE 3 is an end view on line 3—3 of FIGURE 2 with parts broken away.

FIGURE 4 is an enlarged detail of a portion of the engine shown in FIGURE 3.

FIGURE 5 is an end view of the engine similar to FIGURE 3 and on a different plane.

FIGURE 6 is an enlarged cross sectional detail on line 6—6 of FIGURE 5, showing a valve in open position.

FIGURE 7 is an enlarged detail similar to FIGURE 6 showing a valve in closed position.

FIGURE 8 is an end view on line 8—8 of FIGURE 2.

FIGURE 9 is a side view of the engine showing one of the exhaust ports with broken lines indicating the position of a turbine in the engine.

By referring to the drawings and FIGURE 1 in particular, it will be seen that the rotary engine comprises a base 10 supporting a stator or housing 11 which is round in cross section and adapted to receive a closely fitted rotor or turbine rotatably positioned on a transversely positioned shaft 12. The turbine comprises a hub 13 and a secondary hub 13A with circumferentially spaced webs 14 positioned therebetween. The secondary hub 13A has a plurality of radially extending circumferentially spaced blades 15, 15 thereon, three being shown in the form of the invention shown for illustration. It will be observed that the blades 15 are evenly spaced circumferentially with respect to one another and that they extend radially from the secondary hub 13A and terminate in an annular channel 16 in the inner wall of the housing 11. A pair of discs 17, 17 are mounted on the shaft 12 and positioned one on either end of the hubs 13 and 13A as best seen by referring to FIGURE 2 of the drawings. The perimeters of the discs 17, 17 are positioned within and adjacent the sides of the annular channel 16 formed in the housing.

A plurality of circumferentially spaced radially positioned blades 18, 18 are secured at their opposite ends to the discs 17, 17 and are positioned in evenly spaced relation to one another and to the blades 15, 15. Curved baffles 19, 19 are positioned adjacent the blades 15, 15 as best seen in FIGURE 1.

Oppositely disposed inlet portions 20, 20 are formed in the housing 11 in communication with the annular channel 16 and outlet ports 21, 21 are spaced intermediate to the inlet ports 20 and also communicate with the annular channel 16. Each of the inlet ports 20 is in communication with a firing chamber 22, 22 and the communicating passageways 22A, 22A formed therebetween are controlled by valves 23, 23. The firing chambers 22 are finned as at 24, 24 for cooling and each is provided with a spark plug 25, air supply tube 26 and a fuel supply line 27. The passageways 22A, 22A which establish communication between the firing chambers 22 and the annular channel 16 within the housing 11 form means by which a directed and shaped jet of expanding gases fired in the firing chambers 22, 22 are directed against the blades 15 and secondary blades 18 of the turbine. In order that controlled internal combustion may take place in each of the firing chambers 22 a plurality of cams are positioned on the shaft 12 exteriorly of the housing 11 and engaged by a plurality of cam shafts which in turn operate air control valves, fuel control valves and the valves 23 which control the passageways 22A, 22A between the firing cylinders 22, 22 and the housing 11.

As seen in FIGURES 2, 3 and 4 a cam 28 is positioned so as to simultaneously operate two oppositely disposed cam shafts 29, 29 which in turn are spring urged against the cam 28 by coil springs 30, 30 engaging apertured mounting brackets 31, 31 through which the cam shafts 29 are positioned. The cam shafts 29, 29 operate slide valves 32, 32 in air valves 33, 33 which control the air supply lines 26, 26. The air lines 26, 26 communicate with an air compressor or other suitable source of compressed air (not shown). A second cam 34 on the shaft 12 which is positioned adjacent to the cam 28 and as best illustrated in FIGURE 5 is arranged to actuate a pair of secondary oppositely disposed cam shafts 35, 35 which are spring urged toward the cam 34 by coil springs 36, 36 engaged against apertured brackets 37, 37 on the housing 11. The outer ends of the cam shafts 35, 35 are offset and operatively engaged on levers 38, 38 which in turn are secured to the valves 23, 23 heretofore referred to and as illustrated in enlarged detail in FIGURES 6 and 7. The valves 23, 23 are rotatable plug valves and as shown in FIGURE 6 when moved to one position present a transverse passageway 39 axially to the passageway 22A to effectively open the same and when rotated provide a closure as seen in FIGURE 7.

By referring now to FIGURE 8 of the drawings, it will be seen that a fuel supply line 40 leads from a fuel source (not shown) to each of a pair of fuel injectors 41, 41 by way of one-way valves 42, 42. The fuel injectors 41, 41 are operated by a third cam 43 positioned on the shaft 12 and arranged to operate a third pair of oppositely disposed cam shafts 44, 44 which are spring urged by springs 45, 45 toward the third cam 43. The outermost ends of the cam shafts 44, 44 comprise pistons 46, 46 engaged in cylinders 47, 47 in the fuel injectors 41, 41 and the fuel supply lines 27, 27 communicate with the cylinders 47, 47 as to the fuel supply lines 40. It will thus be observed that when the shaft 12 is revolved as by a starter (not shown) the valves 23, 23 will be closed and opened successively by the operation of the cam 34 on the levers 38, 38 thereof. The cam 28 then actuates one of the air valves 33 to open the same and permit a charge of compressed air to be delivered into one of the firing chambers 22 whereupon the air valve 33 closes and the cam 43 actuates one of the pistons 46 in one of the fuel injectors 41 to cause a measured amount of fuel to be injected into one of the firing chambers. One of the spark plugs 25 is then energized from a distributor and ignition coil (not shown) which distributor is driven by a gear 48 on the shaft 12, and the fuel charge in the firing chamber 22 is ignited whereupon the cam 34 actuates one of the levers 38 controlling one of the valves 23 and places the firing chamber 22 and the expanding burning gases therein in communication with the interior of the housing 10 and more particularly the annular channel 16 thereof where the expanding gases emerge in a jet-like stream to forceably engage the blades 15, 15 and secondary blades 18, 18 of the turbine thus causing it to revolve.

The rotation of the turbine moves the blades 15 so that they alternately provide communication between one segment of the turbine and one of the firing chambers 22, 22 and between the same segment of the turbine when it has moved progressively and one of the outlet ports 21, 21.

It will thus be seen that the curved baffles 19 on the fronts of each of the blades 15 tends to urge the products of combustion outwardly through the outlet ports 21 where they communicate with exhaust pipes.

In order that the rotary engine disclosed herein may be operated at efficient temperatures, means for ventilating the same are provided in the form of a plurality of fan blades 49, 49 positioned radially on the outer sides of each of the discs 17, 17 and spaced circumferentially with respect to one another. Openings 50, 50 are provided in the opposite sides of the housing 11 and rotation of the turbine formed by the discs 17, 17, the blades 15, 15 and secondary blades 18, 18 will cause simultaneous rotation of the fan blades 49, 49 and direct cooling air currents transversely of the housing 11 through the hollow hub 13A and thereby maintain the rotary engine at a suitable operating temperature. It will occur to those skilled in the art that while the rotary engine illustrated herein uses two firing chambers and three main turbine blades 15 the number of both the firing chambers and turbine blades may be varied.

It will thus be seen that a rotary engine meeting the several objects of the invention has been disclosed and having thus described my invention, what I claim is:

1. A rotary engine comprising a housing and a rotor defining an annular chamber, an annular channel formed in said housing, a shaft positioned transversely of said chamber, a turbine having a plurality of radial blades mounted on said shaft within said chamber and having the ends of said blades located in said annular channel, discs on said shaft at either side of said turbine the peripheral edges of said discs located in said annular channel, at least one secondary housing defining a firing chamber mounted exteriorly of said housing and having a passageway communicating with said annular channel, valve means in said passageway and means for introducing compressed air and fuel charges into said firing chamber and for igniting the same therein, timing means on said shaft controlling said air, fuel and ignition means and said valve in said passageway, and at least one exhaust port in said housing in spaced relation to said firing chamber passageway.

2. The rotary engine set forth in claim 1 and wherein a plurality of secondary turbine blades are positioned between said discs in spaced relation to said shaft, and to said radial blades of said turbine.

3. The rotary engine set forth in claim 1 and wherein the turbine has a hollow hub forming an air passageway around said shaft and wherein a plurality of fan blades are affixed to said discs on the opposite sides thereof relative to said turbine and wherein said housing is provided with air passageways in its opposite sides.

References Cited in the file of this patent

UNITED STATES PATENTS

| | | |
|---|---|---|
| 1,132,742 | Smiddy | Mar. 23, 1915 |
| 2,448,972 | Gizara | Sept. 7, 1948 |
| 2,504,854 | Longfellow | Apr. 18, 1950 |
| 3,040,530 | Yalnizyan | June 26, 1962 |